United States Patent
Katsumata

(10) Patent No.: US 8,064,947 B2
(45) Date of Patent: Nov. 22, 2011

(54) PORTABLE DEVICE AND INFORMATION MANAGEMENT METHOD

(75) Inventor: Hajime Katsumata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 497 days.

(21) Appl. No.: 12/289,908

(22) Filed: Nov. 6, 2008

(65) Prior Publication Data

US 2009/0247215 A1 Oct. 1, 2009

(30) Foreign Application Priority Data

Mar. 31, 2008 (JP) ................................ 2008-090737

(51) Int. Cl.
*H04M 1/00* (2006.01)
(52) U.S. Cl. .................................... 455/550.1; 379/419
(58) Field of Classification Search ............... 455/550.1; 379/419–440
See application file for complete search history.

(56) References Cited

U.S. PATENT DOCUMENTS

| | | | |
|---|---|---|---|
| 7,274,928 B2 * | 9/2007 | Netanel et al. | 455/415 |
| 7,711,359 B2 * | 5/2010 | Netanel et al. | 455/419 |
| 7,869,800 B2 * | 1/2011 | Netanel et al. | 455/418 |
| 2003/0061503 A1 * | 3/2003 | Katz et al. | 713/200 |
| 2005/0102529 A1 * | 5/2005 | Buddhikot et al. | 713/200 |
| 2006/0035663 A1 * | 2/2006 | Cheng | 455/550.1 |
| 2008/0051117 A1 * | 2/2008 | Khare et al. | 455/458 |
| 2009/0054033 A1 * | 2/2009 | Pratt et al. | 455/410 |
| 2009/0124297 A1 * | 5/2009 | Liu et al. | 455/572 |
| 2009/0247124 A1 * | 10/2009 | de Atley et al. | 455/410 |
| 2009/0247215 A1 * | 10/2009 | Katsumata | 455/550.1 |
| 2010/0317397 A1 * | 12/2010 | Sinai | 455/550.1 |
| 2011/0090829 A1 * | 4/2011 | Wu | 370/311 |
| 2011/0099142 A1 * | 4/2011 | Karjalainen et al. | 707/600 |
| 2011/0165917 A1 * | 7/2011 | Taylor | 455/566 |

FOREIGN PATENT DOCUMENTS

| | | |
|---|---|---|
| JP | 2003-163735 | 6/2003 |
| JP | 2006-254119 | 9/2006 |
| KR | 10-2005-0007736 | 1/2005 |

OTHER PUBLICATIONS

Korean Patent Abstracts, Publication No. 10-2005-0007736, Published Jan. 21, 2005.
Korean Patent Office Action dated Sep. 17, 2010 in application No. 10-2008-0115512.

(Continued)

*Primary Examiner* — Lincoln Donovan
*Assistant Examiner* — Adam Houston
(74) *Attorney, Agent, or Firm* — Staas & Halsey LLP.

(57) ABSTRACT

A portable device and an information management method are provided whereby personal information can be safely shared between two systems. Each entry of telephone directory information includes callee identification information identifying a callee to be called by mobile phone function and is readable from and updatable by an information processor. Use restriction information shows availability of each telephone directory information entry and includes read permission information indicating whether each telephone directory information entry can be read out or not. When a request to read out an entry of the telephone directory information is received from another information processor, a use restriction processor looks up the use restriction information corresponding to the requested entry of the telephone directory information and, if readout of the requested entry is permitted, permits the requested entry of the telephone directory information to be read out and provided to the information processor.

13 Claims, 14 Drawing Sheets

OTHER PUBLICATIONS

Digital Cellular Telecommunications System (Phase 2+); Specification of the Subscriber Identity Module—Mobile Equipment (SIM-ME) Interface (3GPP TS 11.11 version 8.14.0 Release 1999), ETSI TS 100 977 V8.14.0 (Jun. 2007).

Patent Abstracts of Japan, Publication No. 2006-254119, published Sep. 21, 2006.
Patent Abstracts of Japan, Publication No. 2003-163735, published Jun. 6, 2003.

* cited by examiner

152 PROGRAM INFO

| Security level | Program name |
|---|---|
| L1 | PG1, PG2, ...... |
| L2 | PG11, PG12, ...... |
| L3 | PG21, PG22, ...... |

HIGH ↑ SECURITY ↓ LOW

FIG. 7

151a DIRECTORY INFO

| | Security level | |
|---|---|---|
| | Read | Rewrite |
| Name | L1,L2 | L1 |
| Phone no. | L1,L2 | L1 |
| Mail address | L1,L2 | L1 |
| Birth date | – | – |
| Address | – | – |
| Group | L1~L3 | L1,L2 |

FIG. 8

PORTABLE DEVICE AND INFORMATION MANAGEMENT METHOD

CROSS-REFERENCE TO RELATED APPLICATIONS

This application is based upon and claims the benefits of priority from the prior Japanese Patent Application No. 2008-090737 filed on Mar. 31, 2008, the entire contents of which are incorporated herein by reference.

BACKGROUND OF THE INVENTION

1. Field of the Invention

The present invention relates to portable devices with information processing functions including a mobile phone function, and information management methods for such portable devices. More particularly, the present invention relates to a portable device equipped with two, first and second information processors, and an information management method therefor.

2. Description of the Related Art

In recent years, mobile phones enabling wireless voice communication have come into wide use. In addition to the voice communication function, many mobile phones have the capability to send and receive electronic mail. Such mobile phones are often configured to store therein personal information such as names, telephone numbers and mail addresses of persons who can be callers/callees or senders/recipients of electronic mail so that when making a call or sending electronic mail, the user can retrieve and use the information stored beforehand. Further, mobile phones of this type are very often adapted to collectively manage personal information that has no direct connection with telephone call or electronic mail, such as addresses of callers/callees or mail senders/recipients.

On the other hand, there has been a demand for information handling schemes that allow an external device such as a PC (personal computer) to make use of the information stored in the mobile phone. For example, a system has been known in which a computer and a mobile phone are connected to each other by a communication cable to permit the mail data sent/received by the mobile phone to be viewed from and edited by the computer. With this system, the user can create electronic mail while viewing, on the computer, the telephone directory information stored in the mobile phone (see, e.g., Japanese Unexamined Patent Publication No. 2006-254119). A technique has also been known whereby, when a PC is connected with a portable information terminal, the information stored in the portable information terminal is collated with that stored in the PC to synchronize the stored information (see, e.g., Japanese Unexamined Patent Publication No. 2003-163735).

Meanwhile, the recent development of smaller-sized and higher-performance hardware devices has made it possible to configure multiple systems with different uses within a single, small-sized portable information terminal. Generally, on a single system, one or more operating systems (OSs) are executed with respect to one set of hardware resources including, for example, a CPU (Central Processing Unit) and a RAM (Random Access Memory). In the small-sized information terminal, on the other hand, multiple sets of hardware resources for implementing respective different functions are mounted as independent systems, and individual OSs are run on the respective systems. In order to reduce the size of the information terminal, the monitor and the input device are shared by two systems, for example. The user of the information terminal can access the function of either of the two systems by switching the screen displayed on the monitor.

As such information terminals equipped with multiple systems, terminals have been under study wherein the mobile phone function is implemented by one system while the general-purpose information processing function equivalent to the one provided by a PC, a PDA (Personal Digital Assistance) or the like is implemented by another system. This type of system also should desirably be configured such that the general-purpose information processing function can make use of the personal information held by the mobile phone function.

Generally, however, systems adapted to provide the general-purpose information processing function is associated with the problem that unintended leak of information may possibly be caused, for example, by malicious software. Thus, where the system is configured so as to be able to use the personal information held by the mobile phone, it is essential that leakage of the personal information should be prevented.

SUMMARY OF THE INVENTION

The present invention was created in view of the above circumstances, and an object thereof is to provide a portable device enabling safe sharing of personal information between two systems therein, and an information management method for the portable device.

To achieve the object, there is provided a portable device with information processing functions including a mobile phone function. The portable device comprises a first information processor for processing information by executing a program, a second information processor operable in parallel with the first information processor, for implementing the mobile phone function, an information storage for storing one or more entries of telephone directory information each including callee identification information identifying a callee to be called by the mobile phone function, the telephone directory information being readable from and updatable by the second information processor, and use restriction information indicating availability of each entry of the telephone directory information, the use restriction information including read permission information indicating whether each entry of the telephone directory information can be read out or not, and a use restriction processor responsive to a read request received from the first information processor and requesting readout of an entry of the telephone directory information, for looking up the use restriction information corresponding to the requested entry of the telephone directory information and, if readout of the requested entry of the telephone directory information is permitted, permitting the requested entry of the telephone directory information to be read out and provided to the first information processor.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 shows an exemplary data structure of program information used in the second embodiment.

FIG. 8 shows an exemplary data structure of telephone directory information used in the second embodiment.

DESCRIPTION OF THE PREFERRED EMBODIMENTS

Figure 1:
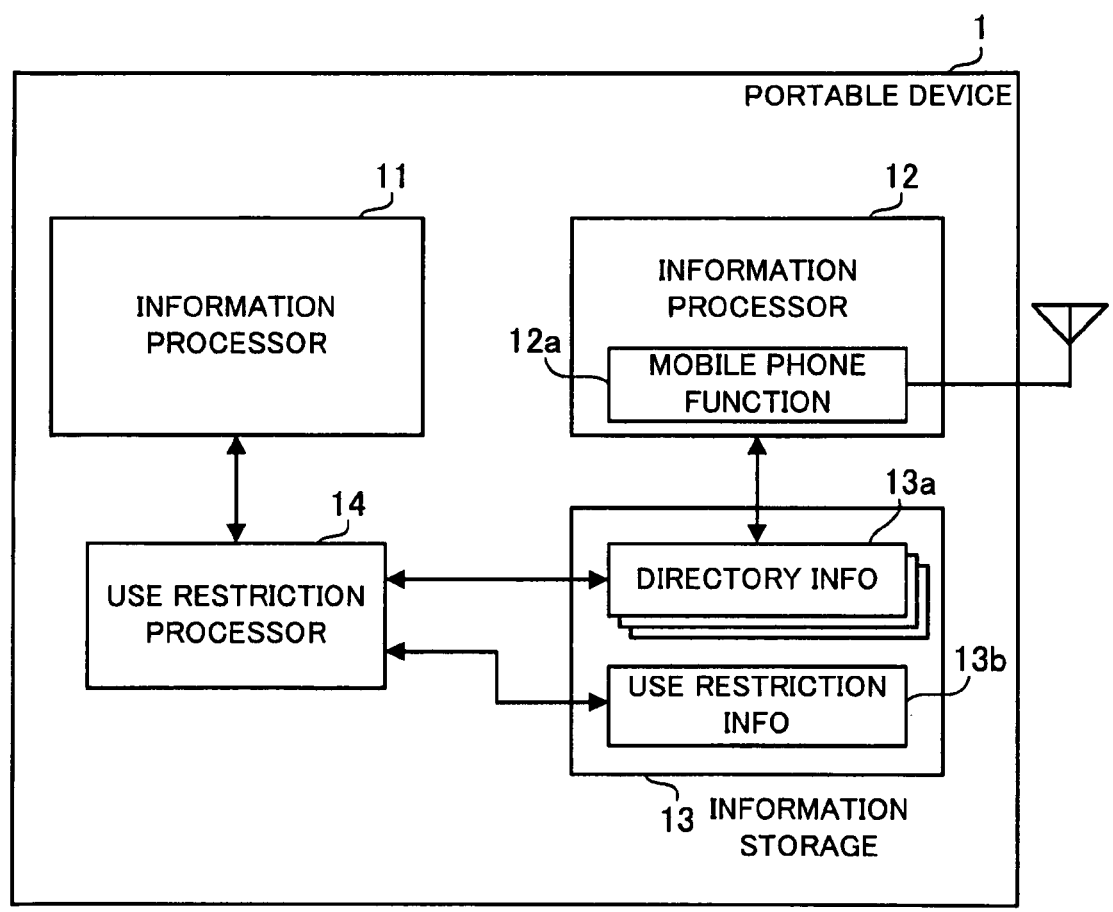
FIG. 1 is a schematic illustration of a portable device according to the present invention.

Preferred embodiments of the present invention will be described in detail below with reference to the accompanying drawings, wherein like reference numerals refer to like elements throughout.

FIG. 1 schematically illustrates a portable device according to the present invention.

As shown in FIG. 1, the portable device 1 includes two information processors 11 and 12 which can operate in parallel with each other. In the information processors 11 and 12, various application programs are executed under the control of respective CPUs provided therein, for example, to operate their internal circuits.

The information processor 11 functions as a general-purpose computer device, for example, with suitable application programs installed in its internal storage device to be executed by the CPU. On the other hand, the information processor 12 is provided internally with a wireless communication interface and is so configured as to implement a mobile phone function 12a by using the wireless communication interface.

The portable device 1 further includes an information storage 13 and a use restriction processor 14. The information storage 13 holds one or more entries of telephone directory information 13a and use restriction information 13b.

Each entry of the telephone directory information 13a includes at least callee identification information identifying a callee to be called by the mobile phone function 12a. The telephone directory information 13a may include, along with the callee identification information, multiple items of personal information such as the name of a person corresponding to the callee.

The telephone directory information 13a can be read out and updated by the second information processor 12 whenever necessary. For example, the mobile phone function 12a is capable of retrieving the callee identification information (e.g., telephone number) from the telephone directory information 13a and originating a call to the callee specified by the callee identification information.

The use restriction information 13b specifies, with respect to each entry of the telephone directory information 13a, whether or not the information processor 11 is permitted to use the telephone directory information 13a. The "use" of the telephone directory information 13a by the information processor 11 includes, for example, readout of the telephone directory information 13a from the information storage 13 and update of the telephone directory information 13a in the information storage 13. In this case, the use restriction information 13b may include read permission information indicating whether readout of the telephone directory information 13a is permitted or not, and update permission information indicating whether update of the telephone directory information 13a is permitted or not.

When use of the telephone directory information 13a is requested from the information processor 11, the use restriction processor 14 determines based on the use restriction information 13b whether the use of the requested telephone directory information 13a is permitted or not. If the use of the requested information is permitted, the information processor 11 is allowed to perform the operation. If the use of the requested information is not permitted, the requested operation is refused, and an error notification, for example, is sent to the information processor 11.

For example, where the information processor 11 requests to read out a certain entry of the telephone directory information 13a, such a read request is accepted by the use restriction processor 14. On accepting the read request, the use restriction processor 14 looks up the use restriction information 13b corresponding to the requested entry of the telephone directory information 13a and determines, based on the read permission information, whether readout of the requested entry 13a is permitted or not. If readout of the requested entry is permitted, the use restriction processor 14 allows that entry of the telephone directory information 13a to be read out and provided to the information processor 11. Consequently, the requested entry of the telephone directory information 13a is transferred via the use restriction processor 14, for example, to the information processor 11.

Also, where the information processor 11 requests to update a certain entry of the telephone directory information 13a, for example, the update request is accepted by the use restriction processor 14. On accepting the update request, the use restriction processor 14 looks up the use restriction information 13b corresponding to the requested entry of the telephone directory information 13a and determines, based on the update permission information, whether update of the requested entry 13a is permitted or not. If update of the requested entry is permitted, the use restriction processor 14 allows that entry of the telephone directory information 13a to be updated with the information sent from the information processor 11. Consequently, the corresponding telephone directory information 13a in the information storage 13 is updated with the telephone directory information that has been updated in part or in its entirety by the information processor 11.

As a result of the aforementioned process of the use restriction processor 14, the use of the telephone directory information 13a by the information processor 11 is restricted in accordance with the stored use restriction information 13b. Thus, the telephone directory information 13a can be conveniently shared by both the information processors 12 and 11, and at the same time the use of the telephone directory information 13a by the information processor 11 can be restricted as needed, thereby ensuring security of the telephone directory information 13a.

The use restriction information 13b specifies various availabilities, such as readout and update, with respect to each entry of the telephone directory information 13a as stated above. Alternatively, such availability information may be set with respect to each item of the personal information in the telephone directory information 13a, for example. In this case, when use of a certain entry of the telephone directory information 13a is requested from the information processor 11, the use restriction processor 14 looks up the use restriction information 13b and permits the requested operation to be performed with respect only to the available items in the telephone directory information 13a. In the case of a read request, for example, only the available items are extracted from the corresponding telephone directory information 13a and sent to the information processor 11.

Further, in the use restriction information 13b, availability may be set with respect to each of the application programs executed by the information processor 11. In this case, available items from the telephone directory information 13a or from the personal information can be made to vary depending on the application program executed by the information processor 11.

Preferably, the information storage 13 and the use restriction processor 14 are provided externally to the information processor 11. This minimizes the risk of, for example, the information in the information storage 13 or the process of the use restriction processor 14 being modified by accident.

The information storage 13 may be provided, for example, within the information processor 12. In this case, the use restriction processor 14 may be implemented as a processing function of the information processor 12. Alternatively, the use restriction processor 14 may be implemented by hardware independent of the information processors 11 and 12.

The information storage 13 itself may be a memory region independent of the information processors 11 and 12. In this case, the information storage 13 may be provided as a memory accessible from both the information processors 11 and 12, and a memory interface via which the information processor 11 accesses the memory may be adapted to function as the use restriction processor 14.

Referring now to specific embodiments, the portable device will be explained.

First Embodiment

Figure 2:
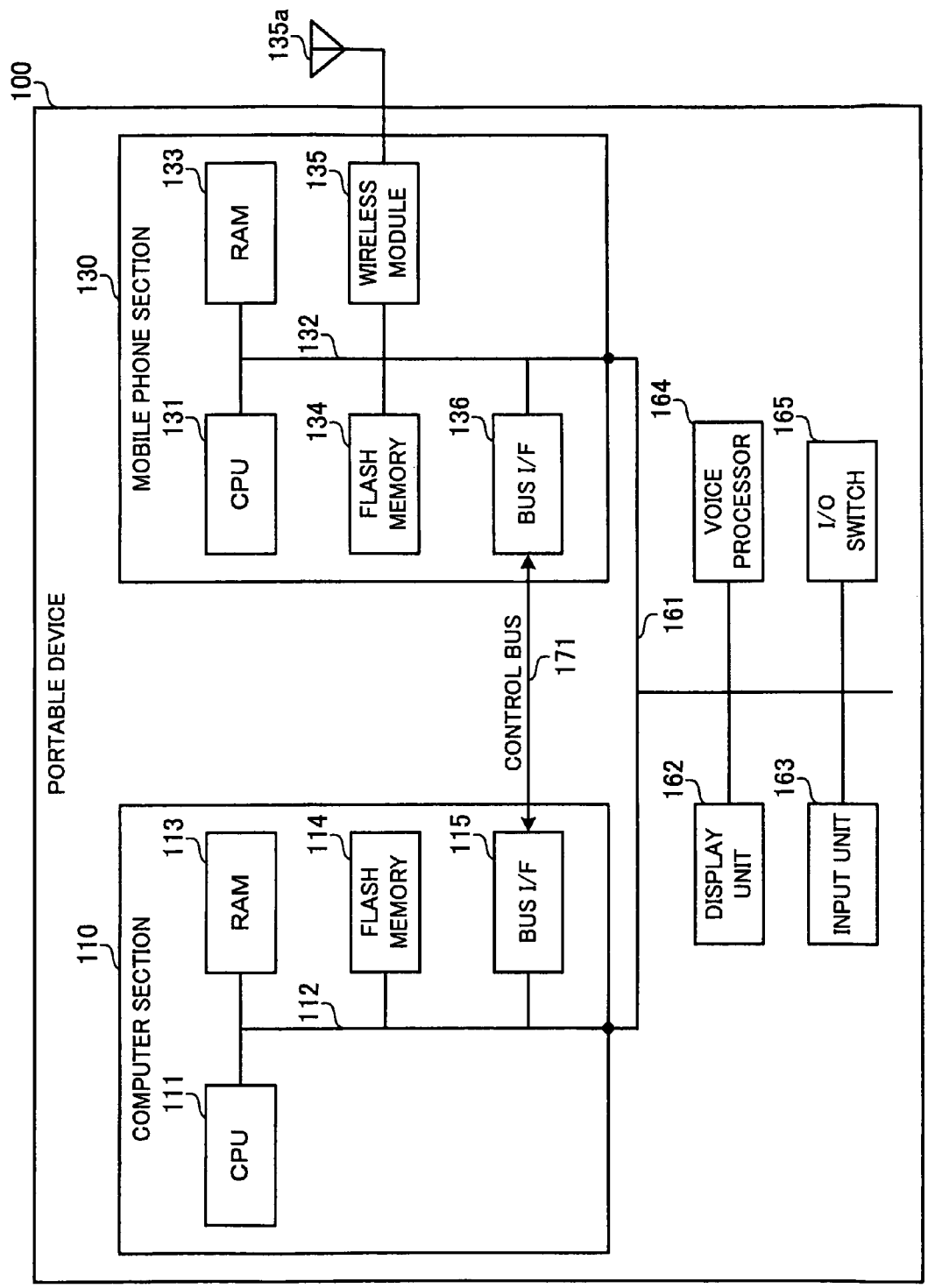
FIG. 2 shows a hardware configuration of a portable device according to a first embodiment.

FIG. 2 illustrates a hardware configuration of a portable device according to a first embodiment.

The portable device 100 shown in FIG. 2 is a portable information terminal capable of operating its two information processors, namely, a computer section 110 and a mobile phone section 130, in parallel with each other. The computer section 110 and the mobile phone section 130 are both connected via a bus 161 to a display unit 162, an input unit 163, a voice processor 164, and an input/output (I/O) switch 165.

Also, the computer section 110 and the mobile phone section 130 are connected to each other by a control bus 171 so that data can exchanged between the two. The control bus 171 is provided to allow the computer section 110 to use telephone directory information held by the mobile phone section 130, as described later.

The computer section 110 includes a CPU 111 for performing integrated control of the computer section. The CPU 111 is connected via a bus 112 with a RAM 113, a flash memory 114, and a bus interface (I/F) 115.

The RAM 113 temporarily stores at least part of the OS and application programs executed by the CPU 111. Also, the RAM 113 stores various data necessary for the processing by the CPU 111.

The flash memory 114 stores the OS and application programs to be run on the computer section 110. Also, the flash memory 114 stores various data necessary for the processing by the CPU 111.

The bus interface 115 is an interface circuit that enables the CPU 111 of the computer section 110 to exchange data with the mobile phone section 130 via the control bus 171.

In the mobile phone section 130, a CPU 131 performs integrated control of the mobile phone section. The CPU 131 is connected via a bus 132 with a RAM 133, a flash memory 134, a wireless communication module 135, and a bus interface 136. An antenna 135a is connected to the wireless communication module 135.

The RAM 133 temporarily stores at least part of the OS and application programs executed by the CPU 131. Also, the RAM 133 stores various data necessary for the processing by the CPU 131.

The flash memory 134 stores the OS and application programs to be run on the mobile phone section 130. Also, the flash memory 134 stores various data necessary for the processing by the CPU 131.

The wireless communication module 135 includes an RF (Radio Frequency) circuit for wireless communication and a modulation/demodulation circuit for transmit/receive signals, and establishes a wireless connection with a base station through the antenna 135a to transmit/receive data to/from the base station. When a wireless connection with a base station is established through the wireless communication module 135 and the antenna 135a, the mobile phone section 130 enables voice communication or data exchange with another information processing device such as a mobile phone.

The bus interface 136 is an interface circuit that enables the CPU 131 of the mobile phone section 130 to exchange data with the computer section 110 via the control bus 171.

Further, in the portable device 100, the display unit 162 is a monitor for displaying images in accordance with instructions from the respective CPUs of the computer section 110 and the mobile phone section 130. As the display unit 162, a liquid crystal monitor is used, for example.

The input unit 163 outputs, to the computer section 110 or the mobile phone section 130, control signals generated according to user's input operations. The input unit 163 is connected, for example, with a keyboard and a pointing device, neither is shown.

The voice processor 164 is connected with a microphone and a speaker, neither is shown. When mobile phone call control is being performed by the mobile phone section 130 (or the computer section 110), the voice processor 164 digitizes voice acquired through the microphone to be output to the controlling section via the bus 161 and also converts voice data output from the controlling section via the bus 161 to an analog signal to be reproduced through the speaker.

The input/output switch 165 switches the target of user's manipulation through the input unit 163 to either of the computer section 110 and the mobile phone section 130. This switching operation enables a switchover of the destination of control signals from the input unit 163 as well as a switchover of the source of information to be output to the display unit 162.

In the portable device 100 configured as above, the computer section 110 acts as a general-purpose information processor that operates as the CPU 111 executes an application program stored in the flash memory 114. On the other hand, the mobile phone section 130 is an information processor specially designed to perform, in the main, the mobile phone function.

When the mobile phone function is performed under the control of the mobile phone section 130, a predetermined call program, for example, is executed by the CPU 131 of the mobile phone section 130, to control the procedure for the transmission/reception of voice data or electronic mail via the wireless communication module 135. While in this state, a predetermined user interface for telephone call is provided to the user through the display unit 162 and the input unit 163 under the control of the call program executed in the mobile phone section 130. Further, the user interface permits the user to retrieve the telephone numbers of callees and the destination addresses of electronic mail recipients from the telephone directory information stored in the flash memory 134.

On the other hand, when the computer section 110 is selected as the target of the user's manipulation by the input/output switch 165, another predetermined user interface is provided through the display unit 162 and the input unit 163 under the control of the application program executed in the computer section 110.

Figure 3:
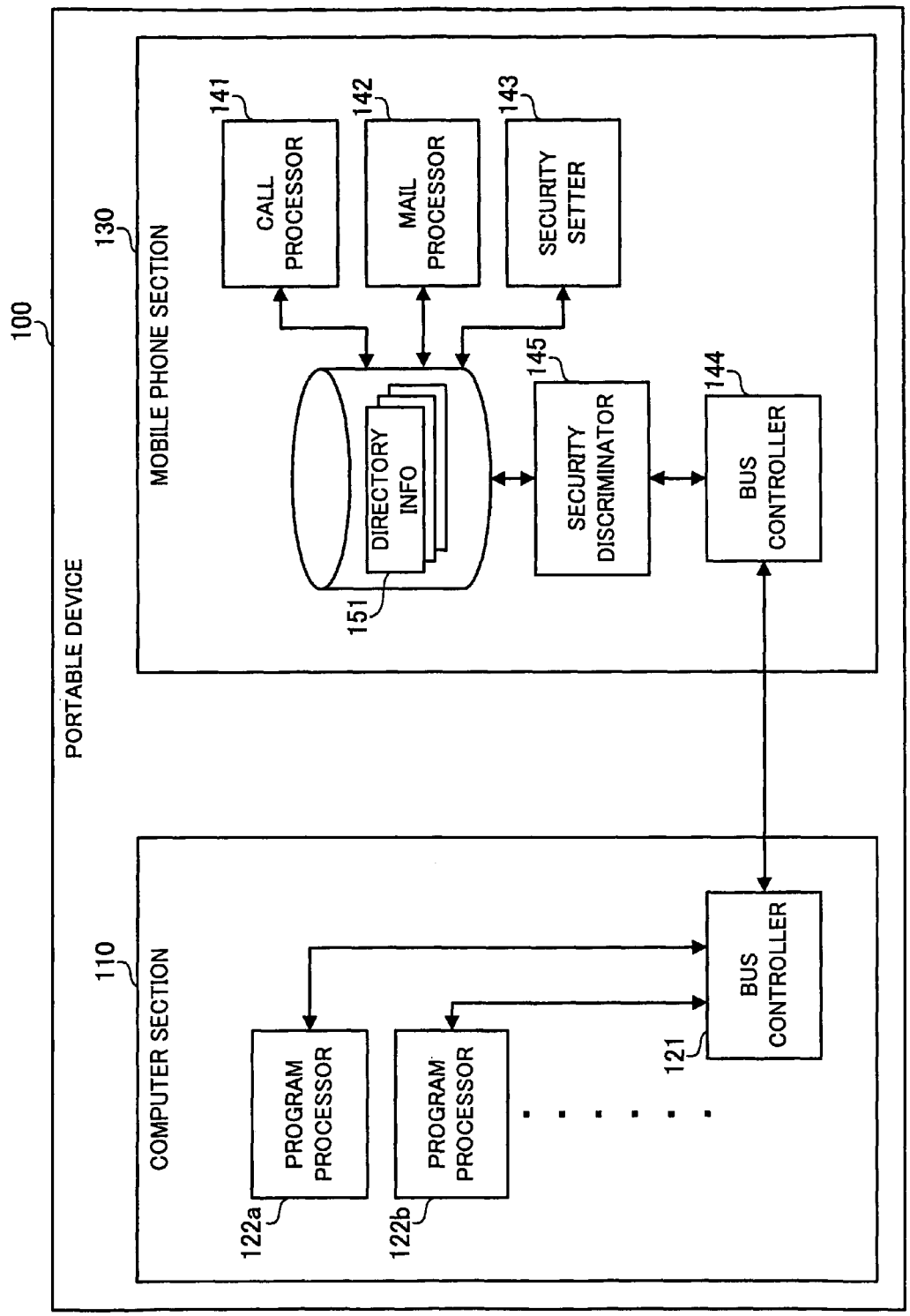
FIG. 3 is a block diagram illustrating functions of the portable device of the first embodiment.

FIG. 3 is a block diagram illustrating the functions of the portable device of the first embodiment.

As shown in FIG. 3, the mobile phone section 130 of the portable device 100 includes a call processor 141, an electronic mail processor 142, a security setter 143, a bus communication controller 144, and a security discriminator 145. These functions are performed when predetermined programs are executed by the CPU 131.

The flash memory 134 of the mobile phone section 130 has telephone directory information 151 stored therein. The telephone directory information 151 includes personal information such as names, telephone numbers and electronic mail addresses of callees or mail recipients, as described later. Also, with respect to each item of the personal information in the telephone directory information 151, a security descriptor is stored in association therewith.

The call processor 141 controls a call process executed through the wireless communication module 135. During the call process, the call processor 141 can look up the telephone directory information 151. For example, in accordance with the user's input operation, the call processor 141 retrieves the telephone number from the requested telephone directory information 151 and originates a call to the retrieved telephone number.

The electronic mail processor 142 controls the process of sending and receiving electronic mails through the wireless communication module 135. The electronic mail processor 142 also can look up the telephone directory information 151 when electronic mail is sent, received, or created. For example, in accordance with the user's input operation, the electronic mail processor 142 retrieves the mail address from the requested telephone directory information 151 and sends electronic mail to the retrieved mail address.

The call processor 141 or the electronic mail processor 142 may be so configured as to be able to newly register, edit, and update the telephone directory information 151.

The security setter 143 updates the security descriptors in the telephone directory information 151 in accordance with the user's input operation.

The bus communication controller 144 controls the bus interface 136 to perform communication with the computer section 110 via the control bus 171. When a request for access to the telephone directory information 151 is received from the computer section 110, the bus communication controller 144 notifies the security discriminator 145 of the access request and carries out a process in accordance with the determination result provided by the security discriminator 145.

When an operation (readout, rewriting, etc.) with respect to the telephone directory information 151 is requested from the computer section 110, the security discriminator 145 determines whether to permit the requested operation or not in accordance with the security descriptors in the corresponding telephone directory information 151. If the requested operation is permitted, the security discriminator 145 executes the operation and sends a response to the bus communication controller 144.

On the other hand, the computer section 110 includes a bus communication controller 121 and program processors 122a, 122b, . . . . These functions are performed when predetermined programs are executed by the CPU 111.

The bus communication controller 121 controls the bus interface 115 to perform communication with the mobile phone section 130 via the control bus 171.

The program processors 122a, 122b, . . . represent functions implemented when respective application programs are executed by the CPU 111. It is assumed that the program processors 122a, 122b, . . . are each adapted to perform a function involving the use of the telephone directory information 151 stored in the mobile phone section 130. The program processors 122a, 122b, . . . individually request an operation with respect to the telephone directory information 151, such as readout, rewriting or the like, through the bus communication controller 121. When such a request is made, the requested operation with respect to the telephone directory information 151 is restricted by the security discriminator 145 of the mobile phone section 130.

Specific examples of processes performed using the telephone directory information 151 by the program processors 122a, 122b, . . . include a process of displaying the contents of the read telephone directory information 151 for editing by a text editor or the like, and a process of inserting the contents of the read telephone directory information 151 into the document or drawing currently created.

In this embodiment, the mobile phone function (e.g., the functions of the call processor 141 and the electronic mail processor 142) is implemented by the mobile phone section 130 only. Alternatively, the processing functions may be performed as program processing functions of the computer section 110 (i.e., as the functions of the program processors 122a, 122b, . . . ), for example, so that telephone calls and the exchange of electronic mails can be executed through the wireless communication module 135 of the mobile phone section 130 under the control of the computer section 110.

In this case, the predetermined user interface for telephone call is provided through the display unit 162 and the input unit 163 under the control of the call program executed in the computer section 110. Also, when the call program is executed, the wireless communication process performed by the wireless communication module 135 is controlled by the computer section 110 via the control bus 171, for example.

Further, at this time, the computer section 110 is allowed to read, via the control bus 171, the telephone directory information 151 held by the mobile phone section 130 so that the read information can be used for the call control or for the creation of electronic mail. In this case, the operation requested with respect to the telephone directory information 151 by the computer section 110 is restricted by the security discriminator 145.

Figure 4:
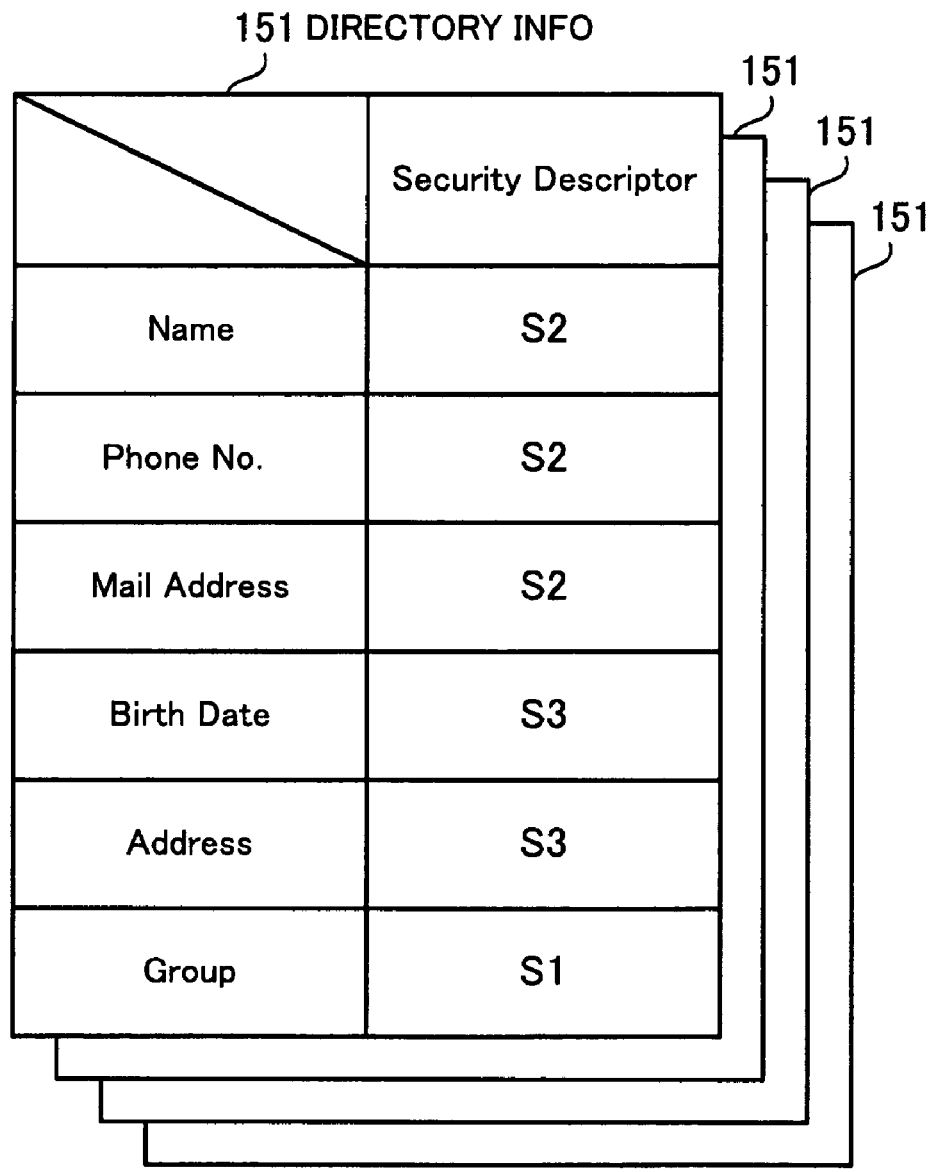
FIG. 4 shows an exemplary data structure of telephone directory information used in the first embodiment.

FIG. 4 illustrates an exemplary data structure of the telephone directory information used in the first embodiment.

As shown in FIG. 4, each entry of the telephone directory information 151 has registered therein personal information including items "name", "telephone number", "mail address", "birth date", and "address". In the figure, the item "group" represents information optionally registered by the user to classify the entries of the telephone directory information 151 into groups. The information registered as "group" is also referred to herein as "personal information" for convenience' sake.

Also, each personal information item registered in the telephone directory information 151 is associated with a security descriptor. The security descriptor is information indicating what operation the computer section 110 is permitted to perform with respect to the corresponding personal information item in the telephone directory information 151. In the example shown in FIG. 4, the security descriptor can assume one of three values S1 to S3. The value S1 indicates that the computer section 110 is permitted to read out and rewrite (update) the personal information. The value S2 indicates that the computer section 110 is permitted to read out the personal information but not to rewrite same, and the value S3 indicates that the computer section 110 is not permitted to read out or rewrite the personal information.

The security setter 143 allows the security descriptors to be optionally set in accordance with the user's input operation.

Figure 5:
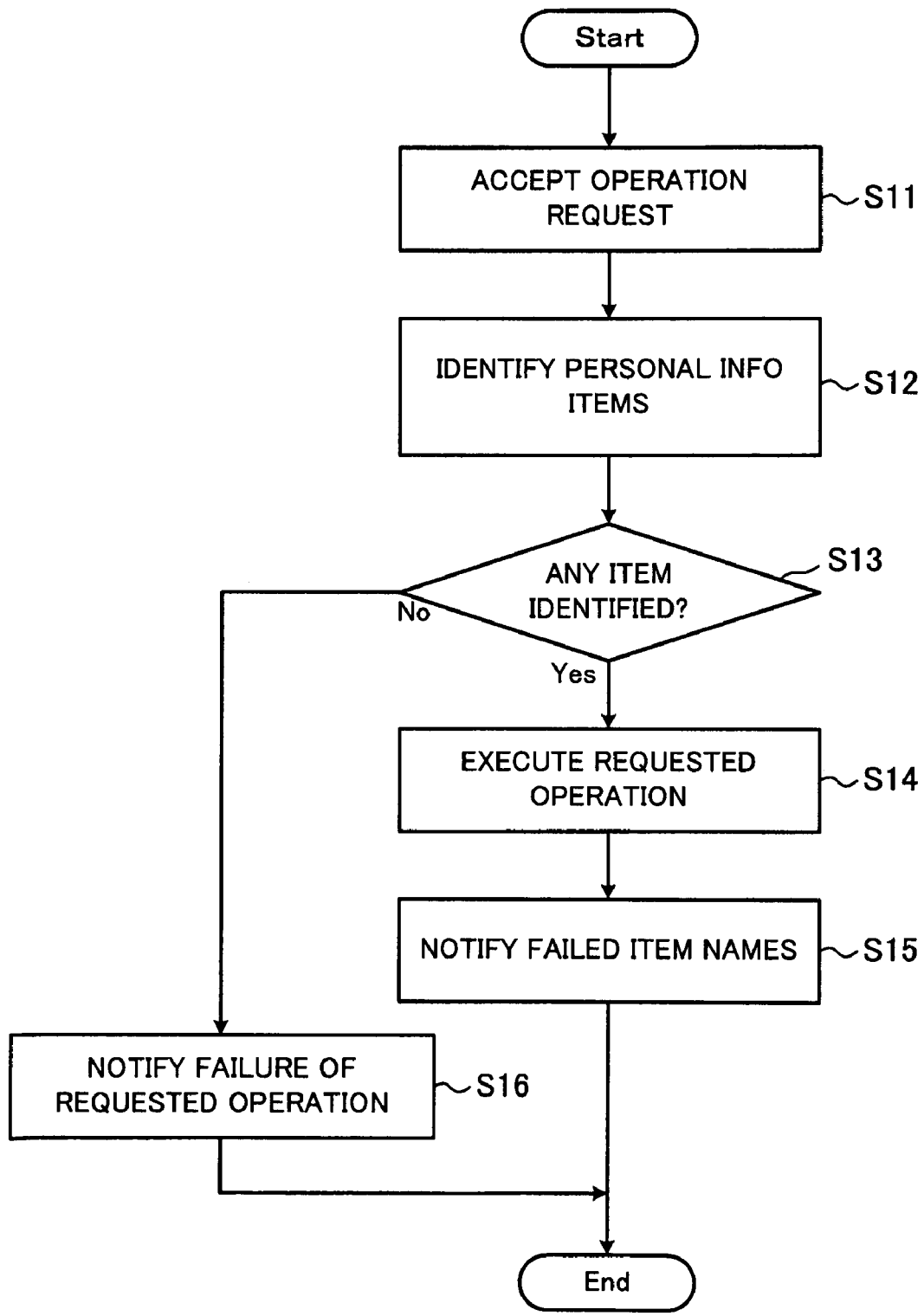
FIG. 5 is a flowchart illustrating a process according to the first embodiment, executed in a mobile phone section when an operation with respect to the telephone directory information is requested by a computer section.

FIG. 5 is a flowchart illustrating a process according to the first embodiment, executed in the mobile phone section when an operation with respect to the telephone directory information is requested by the computer section.

Step S11: One of the program processors 122a, 122b, . . . of the computer section 110 specifies, via the bus communication controller 121, an entry of the telephone directory information 151 in the mobile phone section 130 and sends an operation request to read or rewrite the specified entry. The bus communication controller 144 accepts the operation request via the control bus 171 and notifies the security discriminator 145 of the accepted operation request.

When requesting a rewrite operation, the program processors 122a, 122b, . . . individually transfer, together with the operation request, the telephone directory information of which part (or all) of the personal information has been updated, to the bus communication controller 121 to be sent to the mobile phone section 130. In this case, the bus communication controller 144 of the mobile phone section 130 receives from the computer section 110 the updated telephone directory information along with the operation request and forwards them to the security discriminator 145.

Step S12: The security discriminator 145 looks up the telephone directory information entry 151 with respect to which the read or rewrite operation has been requested, and identifies, based on the security descriptors contained therein, the personal information items permitting the requested operation.

Step S13: If any personal information item permitting the requested operation is identified in Step S12, the security discriminator 145 executes Step S14. On the other hand, if there is no personal information item permitting the requested operation, Step S16 is executed.

Step S14: The security discriminator 145 performs the requested operation with respect to the personal information items permitting the requested operation among those recorded in the corresponding telephone directory information entry 151.

Where a read operation has been requested, the security discriminator 145 reads out the personal information items permitting read operation from the flash memory 134, then transfers the read items to the bus communication controller 144, and requests the controller 144 to send the items to the computer section 110. Thus, only the personal information items permitting read operation are forwarded to the computer section 110 via the control bus 171.

On the other hand, where a rewrite operation has been requested, only the personal information items with respect to which rewrite operation is permitted among those in the updated telephone directory information received from the computer section 110 are written over the corresponding telephone directory information entry 151 stored in the flash memory 134.

Step S15: Step S15 is executed only when it is found in Step S12 that the telephone directory information entry 151 includes a personal information item or items that do not permit the requested operation. In addition to this condition, Step S15 may be executed only if the requested operation is a rewrite operation.

In Step S15, the security discriminator 145 transfers the names of the personal information items with respect to which the requested operation was not performed, to the bus communication controller 144 and requests same to send the item names to the computer section 110. Thus, the computer section 110 is notified of the names of the items with respect to which the requested operation was not performed. In the computer section 110, the program processor that requested the operation displays the notified item names on the display unit 162, for example, so as to inform the user of the item names. For example, where a rewrite operation was requested but some items of the personal information were not rewritten, the user can be informed of the items that failed to be rewritten.

Step S16: The security discriminator 145 sends, to the bus communication controller 144, information that the requested operation was not executed at all, and requests the controller 144 to forward the information to the computer section 110. Consequently, the computer section 110 is notified that the requested operation was not executed. In the computer section 110, the program processor that requested the operation causes the display unit 162 to show information that the requested operation was not executed, for example, thereby notifying the user of the failure of the requested operation.

In the first embodiment described above, the security descriptors specify, with respect to the individual personal information items in the telephone directory information 151, what operation (read, write, etc.) is permitted for the computer section 110. Accordingly, the usage of the telephone directory information 151 by the computer section 110 can be restricted in accordance with the degrees of importance or the like of the individual personal information items registered in the telephone directory information. It is therefore possible to enhance the security in handling the information registered in the telephone directory information 151 while at the same time ensuring the convenience of allowing the computer section 110 to share the telephone directory information 151 in the mobile phone section 130.

Second Embodiment

In the aforementioned first embodiment, the security descriptors are used to specify, with respect to each item of the personal information registered in the telephone directory information 151, what operation is available to the computer section 110. According to a second embodiment explained below, whether an operation is available or not is set additionally with respect to each of application programs requesting the operation from the computer section. Particularly, in the second embodiment, security levels indicative of different degrees of safety are associated with the respective application programs executed in the computer section, in order to achieve the intended operation and advantages. The telephone directory information includes the security levels to specify, with respect to each kind of operation requested from the computer section with respect to the individual personal information items registered therein, application programs that are permitted to perform the operation.

Figure 6:
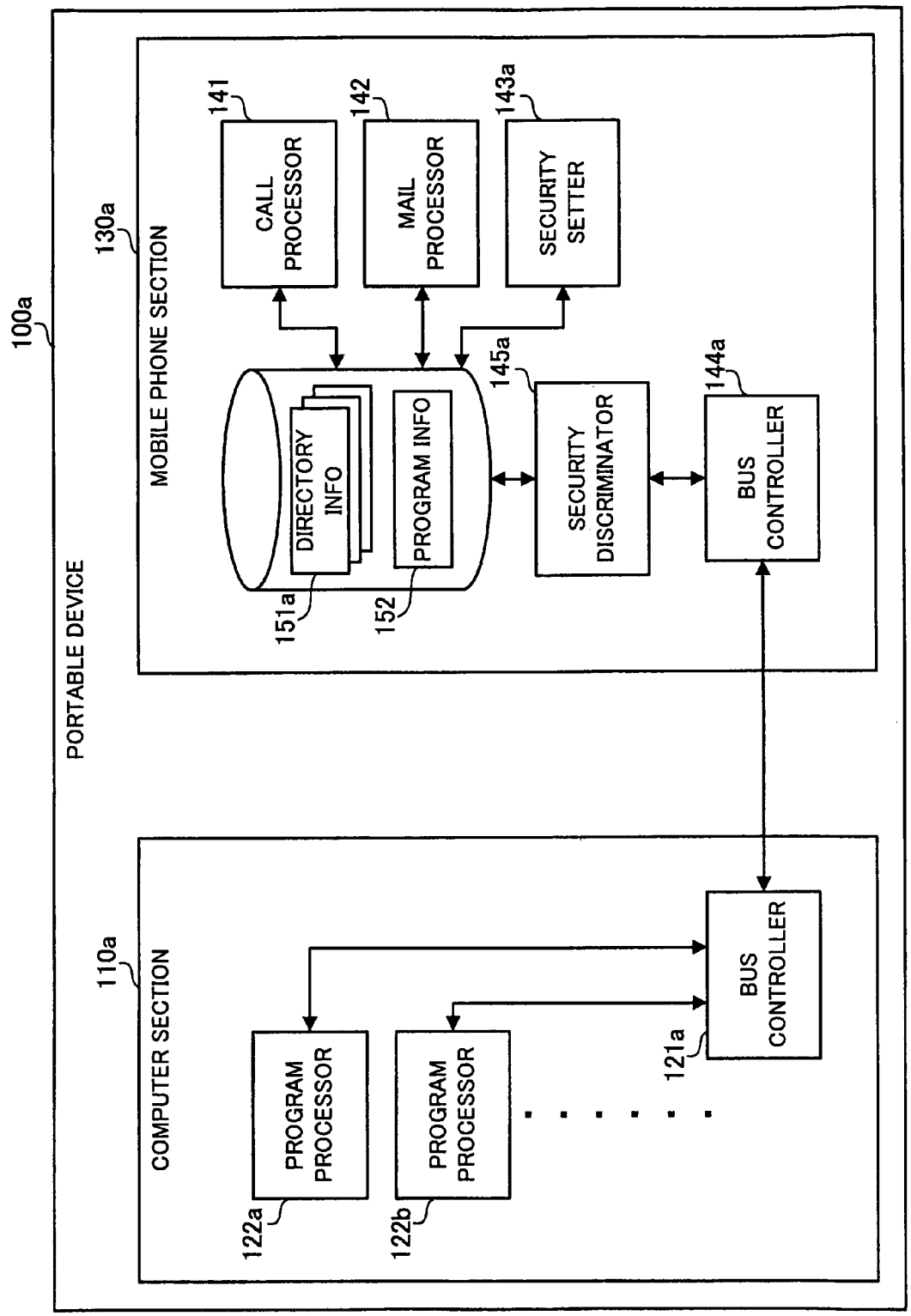
FIG. 6 is a block diagram illustrating functions of a portable device according to a second embodiment.

FIG. 6 is a block diagram illustrating functions of a portable device according to the second embodiment. In FIG. 6, like reference numerals refer to like functional blocks already explained above with reference to FIG. 3, and description of such functional blocks is omitted where appropriate.

Also, the portable device 100a of the second embodiment has a hardware configuration identical with that of the portable device 100 shown in FIG. 2, and therefore, no explanation will be made of the hardware configuration of the portable device 100a shown in FIG. 6. Namely, the portable device 100a of FIG. 6 can be implemented by the hardware configuration shown in FIG. 2.

In the portable device 100a shown in FIG. 6, a computer section 110a and a mobile phone section 130a have their hardware configured in the same manner as the computer section 110 and the mobile phone section 130, respectively, shown in FIG. 2. Namely, the functions of the computer section 110a and the mobile phone section 130a are performed when predetermined programs are executed by the respective CPUs 111 and 131.

The flash memory 134 of the mobile phone section 130a has telephone directory information 151a and program information 152 recorded therein. The telephone directory information 151a has registered therein personal information similar to that held in the first embodiment, such as names, telephone numbers and mail addresses. In addition, with respect to each item of the personal information, security levels are set for the respective kinds of operation requested from the computer section 110a. The program information 152 holds the security levels set in association with the identifications of respective application programs executed in the computer section 110a. Details of the information will be explained later with reference to FIGS. 7 and 8.

During the call process and during the process of sending/receiving electronic mail, the call processor 141 and the electronic mail processor 142 respectively can use the personal information in the telephone directory information 151a. A security setter 143a is capable of editing the security levels registered in the telephone directory information 151a and the program information 152 in accordance with the user's input operation.

When an operation (readout, rewriting, etc.) with respect to the telephone directory information 151a is requested from the computer section 110a via a bus communication controller 144a, a security discriminator 145a determines whether to permit the requested operation or not in accordance with the security levels set in the telephone directory information 151a and the program information 152.

Specifically, the security discriminator 145a identifies the application program requesting the operation, and extracts, from the program information 152, the security level corresponding to the identified application program. Then, the security discriminator 145a looks up the security levels set in the telephone directory information 151a to determine whether or not the security level corresponding to the requesting program matches with the security levels associated with the requested operation. If the security levels match, the security discriminator 145a executes the requested operation and provides a response to the bus communication controller 144a.

As an exemplary method for identifying a program requesting a certain operation, the second embodiment employs a method wherein, when the operation is requested, the identification information of the requesting program is sent from the computer section 110a to the security discriminator 145a via the control bus 171. The bus communication controller 144a accepts the identification information of the requesting program, along with the operation request for the telephone directory information 151a, from the computer section 110a, and notifies the security discriminator 145a of the identification information.

In the computer section 110a, on the other hand, when a certain operation with respect to the telephone directory information 151a is requested from the program processors 122a, 122b, . . . , the operation request is sent to the mobile phone section 130a through a bus communication controller 121a, as in the first embodiment. At this time, the bus communication controller 121a identifies the application program (corresponding to one of the program processors 122a, 122b, . . . ) requesting the operation, and sends the corresponding identification information, along with the operation request, to the mobile phone section 130a.

FIG. 7 illustrates an exemplary data structure of the program information used in the second embodiment.

In the program information 152, program names, as an example of information identifying the individual application programs, are registered in association with the respective security levels. Basically, the security levels indicate respective different degrees of safety of the corresponding application programs. In the illustrated example, a rule is laid down such that the larger the number succeeding the letter "L", the lower the safety of the application program categorized under that security level.

The program names registered in the program information 152 in association with the respective security levels can be optionally set according to the user's input operation through the security setter 143a. For example, when a new application program is installed on the computer section 110a, the user can input a program name for the new application program to be registered in the program information 152 in association with one of the security levels. Also, where the safety of a specific application program has lowered because of a computer virus or the like, the user can change the security level associated with the corresponding program name in the program information 152.

FIG. 8 illustrates an exemplary data structure of the telephone directory information used in the second embodiment.

As shown in FIG. 8, each entry of the telephone directory information 151a has registered therein personal information including the items "name", "telephone number", "mail address", "birth date", "address" and "group", like the first embodiment. Also, with respect to each item of the personal information, "read" and "rewrite" are provided as examples of kinds of operation requested from the computer section 110a. The security level required of the application programs to perform an operation is set with respect to each of the combinations of all items of the personal information and all kinds of operations.

For example, for the information registered under the item "name" in FIG. 8, the application programs with the security level "L1" or "L2" are permitted to perform "read" operation, but only the application programs with the security level "L1"

(i.e., the application programs with the highest security level) are permitted to perform "rewrite" operation.

The security setter 143a allows the security levels to be optionally set in accordance with the user's input operation. Thus, with the telephone directory information 151a, it is possible to optionally specify the kinds of operations that the computer section 110a is permitted to perform with respect to the individual items of the personal information while taking into account the safety of the application programs.

In the example shown in FIG. 8, none of the application programs of the computer section 110a are permitted to perform "read" or "rewrite" operation with respect to the items "birth date" and "address".

Also, in the example of FIG. 8, individual security levels with which to permit the corresponding operation are specified. Alternatively, only the security level at and above which to permit the operation may be specified. For example, where the application programs with the security level "L1" or "L2" are permitted to perform a certain operation, only "L2" may be specified in the telephone directory information 151a.

Figure 9:
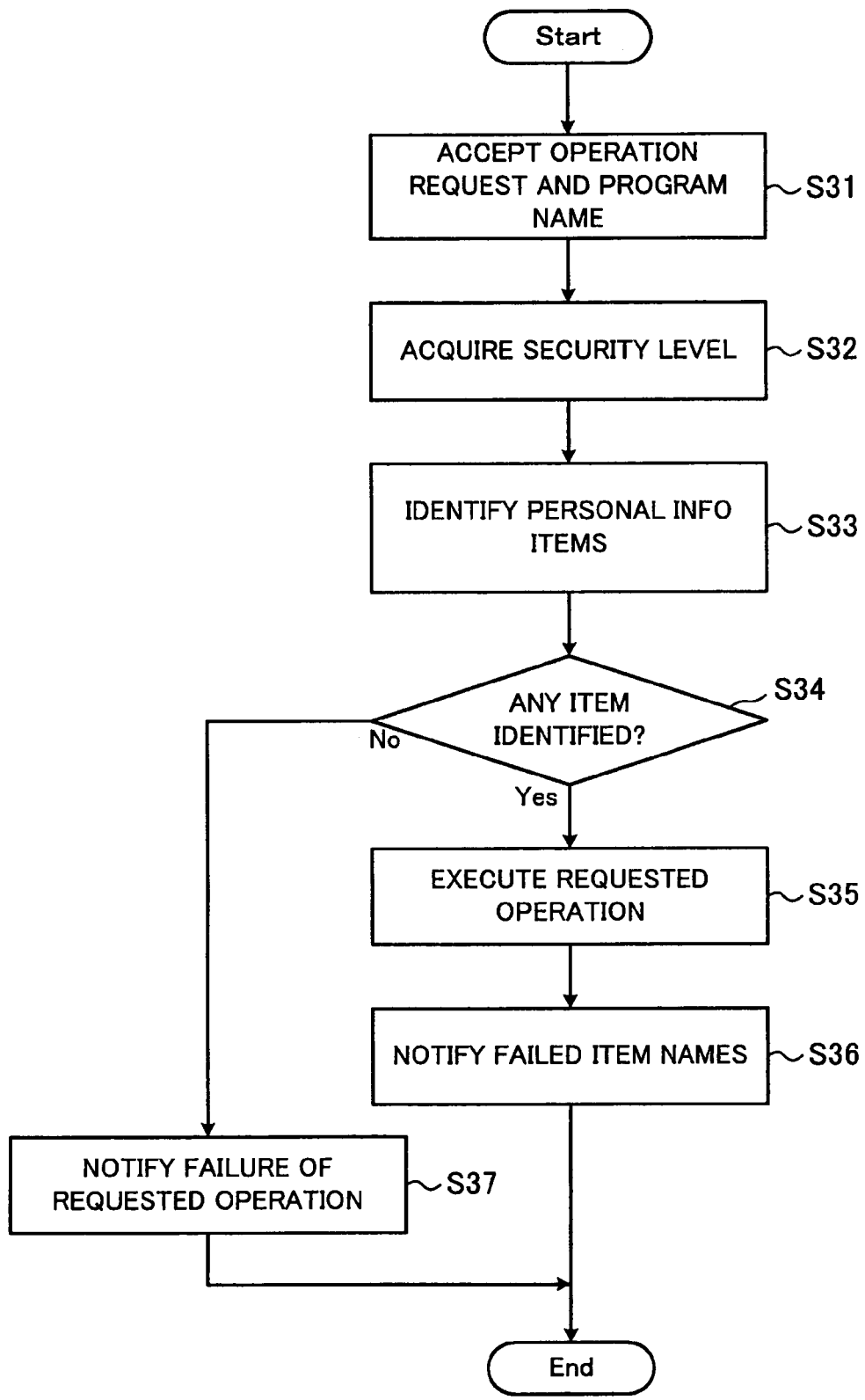
FIG. 9 is a flowchart illustrating a process according to the second embodiment, executed by a mobile phone section when an operation with respect to the telephone directory information is requested by a computer section.

FIG. 9 is a flowchart illustrating a process according to the second embodiment, executed in the mobile phone section when an operation with respect to the telephone directory information is requested by the computer section.

Step S31: One of the program processors 122a, 122b, . . . of the computer section 110a specifies, via the bus communication controller 121a, an entry of the telephone directory information 151a in the mobile phone section 130a and generates an operation request to read or rewrite the specified entry. The bus communication controller 121a sends the operation request to the mobile phone section 130a. Also, at this time, the bus communication controller 121a identifies the program processor requesting the operation and sends, to the mobile phone section 130a, the name of the program being executed by the identified program processor.

The bus communication controller 144a of the mobile phone section 130a accepts the operation request and the program name via the control bus 171 and transfers them to the security discriminator 145a.

When requesting a rewrite operation, the program processors 122a, 122b, . . . individually transfer, together with the operation request, the telephone directory information of which part (or all) of the personal information has been updated, to the bus communication controller 121a to be sent to the mobile phone section 130a. In this case, the bus communication controller 144a of the mobile phone section 130a receives from the computer section 110a the updated telephone directory information along with the operation request and the program name and forwards them to the security discriminator 145a.

Step S32: The security discriminator 145a looks up the program information 152 to acquire the security level associated with the name of the program requesting the operation.

Step S33: The security discriminator 145a reads out the telephone directory information entry 151a with respect to which the operation has been requested, and collates the security levels set for the requested operation with the security level obtained in Step S32. Then, the security discriminator 145a identifies the personal information items permitting the requested operation.

Step S34: If any personal information item permitting the requested operation is identified in Step S33, the security discriminator 145a executes Step S35. On the other hand, if there is no personal information item permitting the requested operation, Step S37 is executed.

Steps S35 and S36: These steps are identical in content with Steps S14 and S15, respectively, in FIG. 5 executed by the security discriminator 145 and the bus communication controller 144. Namely, the security discriminator 145a performs the requested operation with respect to the personal information items permitting the requested operation among those recorded in the corresponding telephone directory information entry 151a.

If it is found in Step S33 that the telephone directory information entry 151a includes a personal information item or items that do not permit the requested operation, or if, in addition to this condition, the requested operation is a rewrite operation, the security discriminator 145a transfers the names of the personal information items with respect to which the requested operation was not performed, to the bus communication controller 144a and requests same to send the item names to the computer section 110a. Thus, the computer section 110a is notified of the names of the items with respect to which the requested operation was not performed.

Step S37: This step is identical in content with Step S16 in FIG. 5 executed by the security discriminator 145 and the bus communication controller 144. Namely, the security discriminator 145a sends, to the bus communication controller 144a, information that the requested operation was not executed at all, and requests the controller 144a to forward the information to the computer section 110a. Consequently, the computer section 110a is notified that the requested operation was not executed.

In the second embodiment described above, whether to permit or forbid various operations requested from the computer section 110a can be set not only with respect to the individual items of the personal information registered in the telephone directory information 151a but also with respect to the individual application programs requesting such operations. Accordingly, the usage of the telephone directory information 151a by the computer section 110a can be restricted in accordance with the security levels of the individual application programs installed on the computer section 110a, in addition to the degrees of importance of the individual personal information items registered in the telephone directory information. Compared with the first embodiment, therefore, it is possible to further enhance the security in handling the information registered in the telephone directory information 151a.

For example, in cases where the security of a certain application program lowers because of a computer virus or the like, access of that program to the personal information can be restricted without delay. Also, even if a malevolent virus program is run on the computer section 110a and the telephone directory information 151a is accessed from the program, such access can be rejected without fail.

Third Embodiment

In the aforementioned second embodiment, the security level is set with respect to each application program so that whether to permit or forbid an operation such as a read or rewrite operation with respect to the individual personal information items in the telephone directory information 151a can be specified with respect to each of the application programs.

To achieve the same operation and advantages, another method may be employed wherein, for example, a security descriptor such as the descriptors S1 to S3 shown in FIG. 4 is set with respect to each of the identifications of the application programs of the computer section in association with the individual personal information items in the telephone directory information. A third embodiment adopting such a method will be now described.

Figure 10:
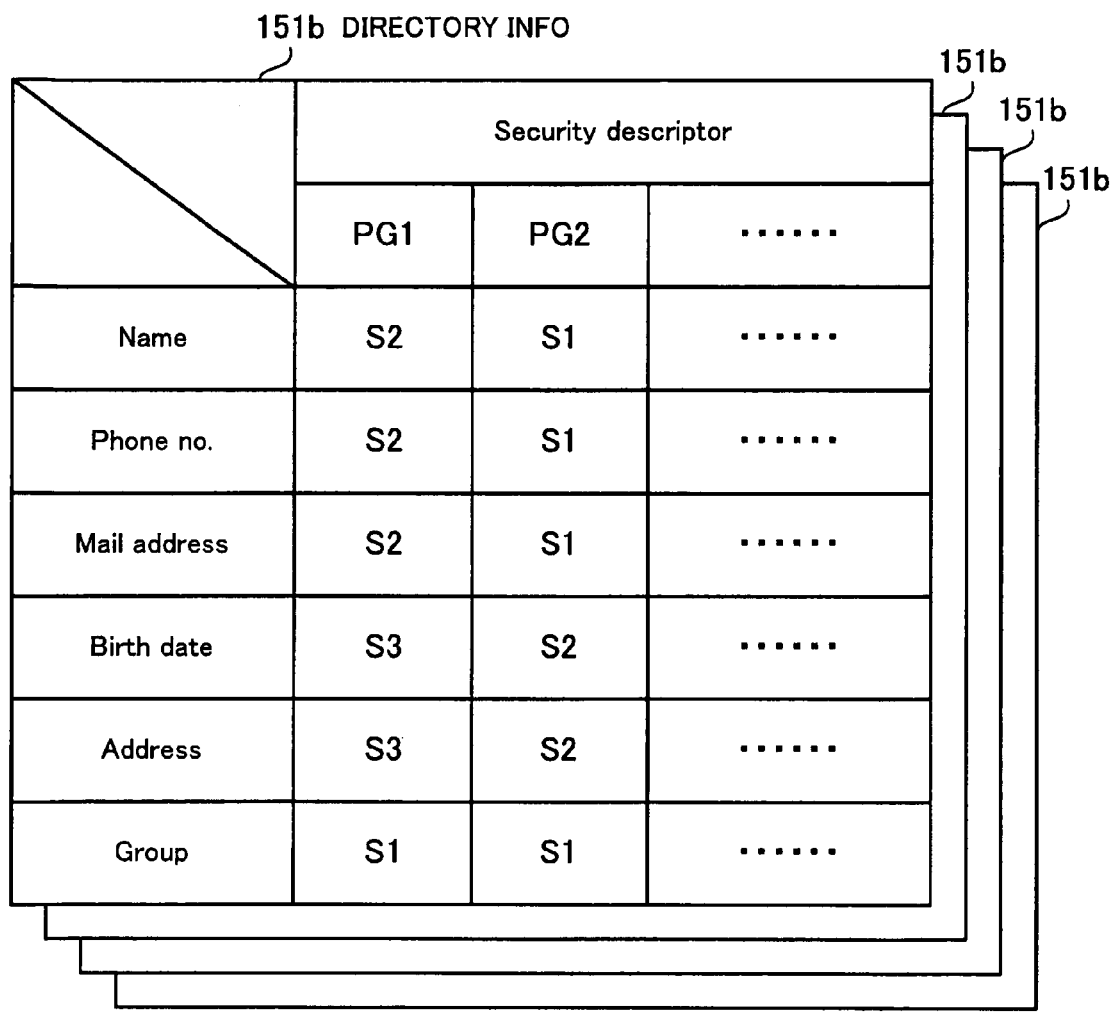
FIG. 10 shows an exemplary data structure of telephone directory information used in a third embodiment.

FIG. 10 illustrates an exemplary data structure of telephone directory information used in the third embodiment.

As shown in FIG. 10, each entry of the telephone directory information 151b has registered therein personal information including the items "name", "telephone number", "mail address", "birth date", "address" and "group", like the one shown in FIG. 4. Also, security descriptors identical with those shown in FIG. 4 are set with respect to the individual items of the personal information. FIG. 10 differs, however, from FIG. 4 in that the security descriptors are set with respect to the identification information (in the illustrated example, the program name "PG1", "PG2") of individual application programs executed in the computer section.

Figure 11:
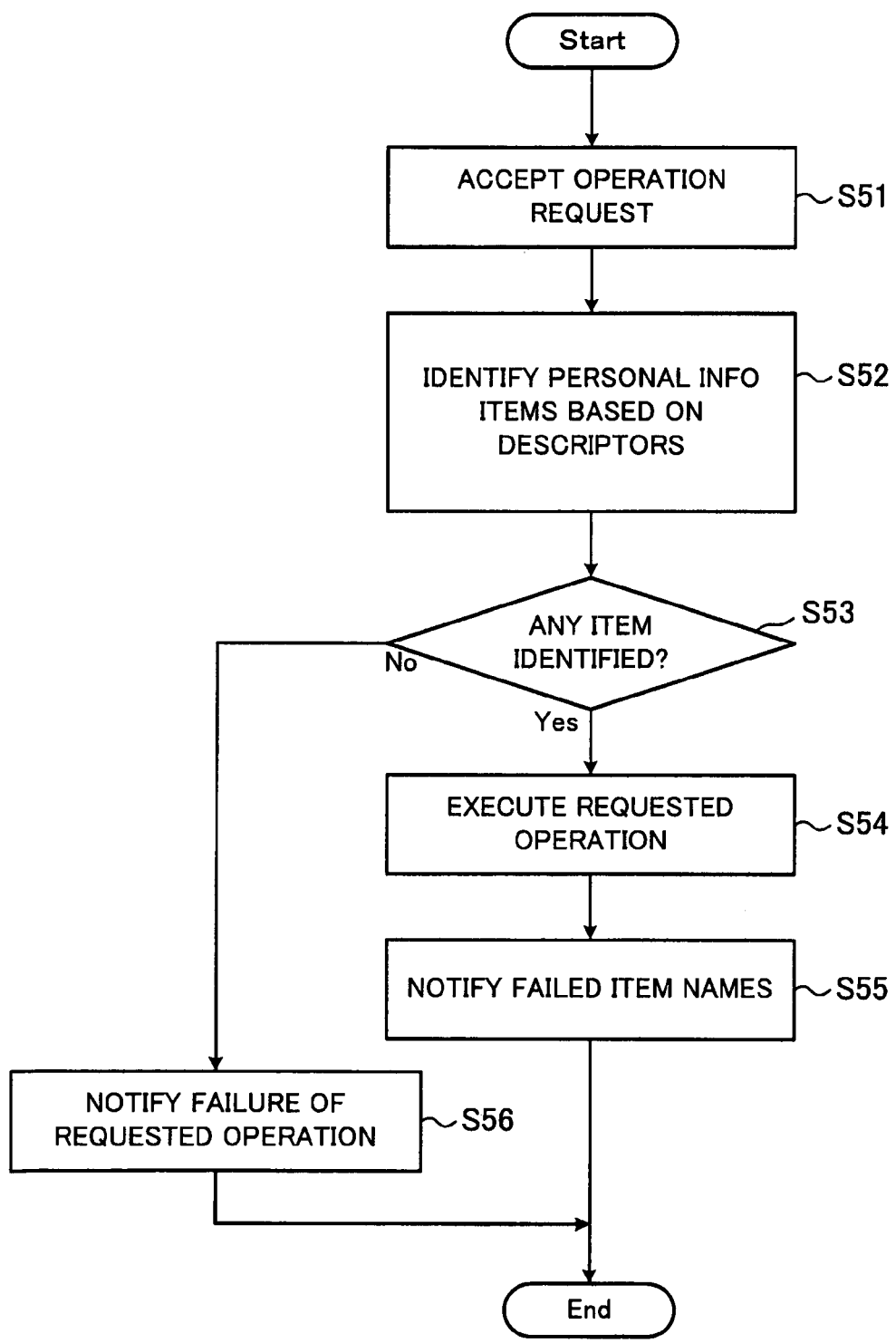
FIG. 11 is a flowchart illustrating a process according to the third embodiment, executed by a mobile phone section when an operation with respect to the telephone directory information is requested by a computer section.

FIG. 11 is a flowchart illustrating a process according to the third embodiment, executed in the mobile phone section when an operation with respect to the telephone directory information is requested by the computer section. Basic functions of a portable device according to this embodiment are identical with those of the portable device of the first embodiment illustrated in FIG. 3. In the following, therefore, the process executed in the portable device holding the above telephone directory information 151b will be explained with reference to the functional blocks shown in FIG. 3.

Step S51: The bus communication controller 144 of the mobile phone section 130 in FIG. 3 receives from the computer section 110 an operation request, such as a read or write request, and the name of the program requesting the operation, like the bus communication controller 144a of the second embodiment, and transfers them to the security discriminator 145.

Step S52: When notified of the operation request and the program name, the security discriminator 145 looks up the telephone directory information entry 151b with respect to which the operation has been requested. Then, based on the security descriptors set in the telephone directory information entry 151b in association with the program name of the operation-requesting program, the security discriminator 145 determines whether or not each item of the personal information permits the requested operation.

The steps executed following this determination are identical with the respective counterparts of the second embodiment. Namely, Steps S53 to S56 in FIG. 11, executed by the bus communication controller 144 and the security discriminator 145, are respectively identical with Steps S34 to S37 in FIG. 9, executed by the bus communication controller 144a and the security discriminator 145a.

According to the above method, with respect to all personal information items in the telephone directory information 151b, permissible operations can be set in association with the identification information of all application programs executed in the computer section. However, each personal information item in the telephone directory information 151b is associated with as many security descriptors as the application programs. Thus, where the number of application program capable of accessing the telephone directory information 151b is large, the data size of the telephone directory information 151b per se increases correspondingly, in contrast with the second embodiment.

Fourth Embodiment

Figure 12:
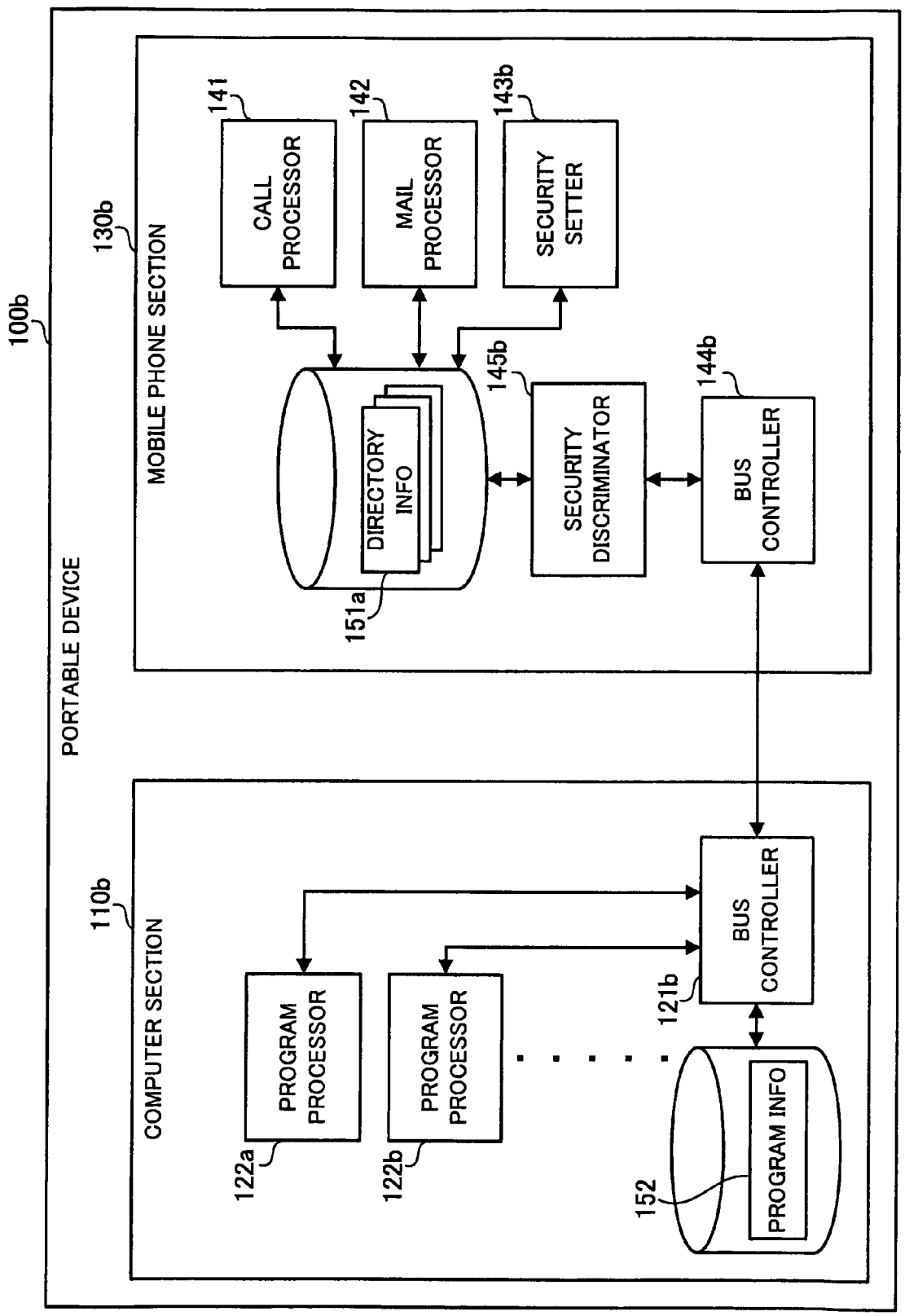
FIG. 12 is a block diagram illustrating functions of a portable device according to a fourth embodiment.

FIG. 12 is a block diagram illustrating functions of a portable device according to a fourth embodiment. In FIG. 12, like reference numerals refer to like functional blocks also appearing in FIG. 6, and description of such functional blocks is omitted where appropriate.

Further, the portable device 100b of the fourth embodiment has a hardware configuration identical with that of the portable device 100 shown in FIG. 2, and therefore, no explanation will be made of the hardware configuration of the portable device 100b shown in FIG. 12. Namely, the portable device 100b of FIG. 12 can be implemented by the hardware configuration shown in FIG. 2.

In the portable device 100b shown in FIG. 12, a computer section 110b and a mobile phone section 130b have their hardware configured in the same manner as the computer section 110 and the mobile phone section 130, respectively, shown in FIG. 2. Namely, the functions of the computer section 110b and the mobile phone section 130b are performed when predetermined programs are executed by the respective CPUs 111 and 131.

The greatest difference between the portable device 100b and the portable device 100a of the second embodiment resides in that the program information 152 is stored in the flash memory 114 of the computer section 110b, and not the mobile phone section 130b. The program information 152 is identical in content with that used in the second embodiment, and therefore, description thereof is omitted. The telephone directory information 151a, on the other hand, which is identical with that used in the second embodiment, is stored in the flash memory 134 of the mobile phone section 130b. Thus, description of the content of the telephone directory information 151a is omitted.

On accepting a certain operation request for the telephone directory information 151a from one of the program processors 122a, 122b, . . . , a bus communication controller 121b of the computer section 110b identifies the name of the program requesting the operation and acquires, from the program information 152, a corresponding security level. Then, the bus communication controller 121b sends information on the acquired security level, along with the operation request, to the mobile phone section 130b via the control bus 171.

A bus communication controller 144b of the mobile phone section 130b forwards the operation request and the security level, received via the control bus 171, to a security discriminator 145b. The security discriminator 145b looks up the security levels set in the telephone directory information 151a to determine whether or not the security level notified from the computer section 110b matches with the security levels associated with the requested operation. If the security levels match, the security discriminator 145b executes the requested operation and provides a response to the bus communication controller 144b.

Thus, in the fourth embodiment, the security level associated with the program requesting an operation with respect to the telephone directory information 151a is acquired in the computer section 110b. Accordingly, the mobile phone section 130b can immediately determine whether to permit the requested operation or not by collating the notified security level directly with the information registered in the telephone directory information 151a.

A security setter 143b of the mobile phone section 130b allows the security levels set in the telephone directory information 151a to be updated in accordance with the user's input operation.

The program information 152 stored in the computer section 110b may also be made updatable in accordance with the user's input operation. In this embodiment, however, it is desirable that the program information 152 should be managed safely in the computer section 110b. For example, only specific application programs with high security are permitted to update the program information 152. As a specific example, a method may be adopted wherein the CPU of the computer section 110*b* and a specific application program are equipped with mutual authentication function so that only the application program authenticated by the CPU can access the program information 152.

Figure 13:
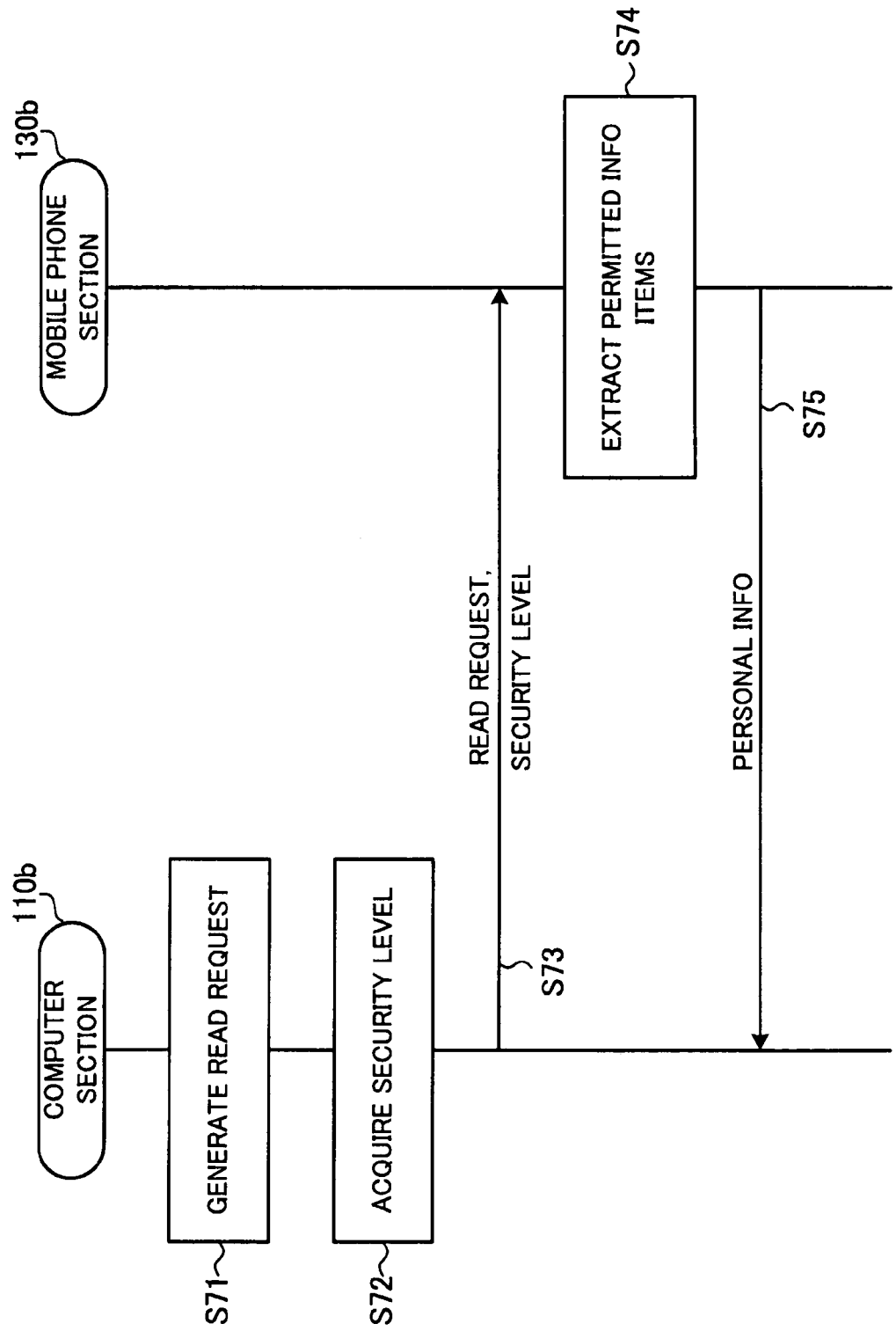
FIG. 13 illustrates a flow of process executed in the portable device of the fourth embodiment when an operation with respect to telephone directory information is requested by a computer section.

FIG. 13 illustrates a flow of process according to the fourth embodiment, executed in the portable device when an operation with respect to the telephone directory information is requested from the computer section. In the process flow shown in FIG. 13, a read operation with respect to the telephone directory information 151*a* is requested from the computer section 110*b*, by way of example.

Step S71: One of the program processors 122*a*, 122*b*, . . . of the computer section 110*b* requests the bus communication controller 121*b* to read out an entry of the telephone directory information 151*a* in the mobile phone section 130*b*.

Step S72: The bus communication controller 121*b* first identifies the program processor requesting the operation and acquires the name of the program being executed by the identified program processor. Then, the bus communication controller 121*b* searches the program information 152 for the program name to acquire the security level associated with the program being executed.

Step S73: The bus communication controller 121*b* sends the read request, as well as the security level acquired in Step S72, to the mobile phone section 130*b* via the control bus 171.

The procedure for processing a write request from a program processor is basically identical with the procedure described above. The difference between the two is that the telephone directory information of which part (or all) of the personal information has been updated, for example, is sent along with a write request from the program processor to the bus communication controller 121*b* and then to the mobile phone section 130*b*.

Step S74: The bus communication controller 144*b* of the mobile phone section 130*b* accepts the read request and the security level via the control bus 171 and forwards them to the security discriminator 145*b*.

The security discriminator 145*b* looks up the telephone directory information entry 151*a* with respect to which readout has been requested, and collates the security levels set for the read operation with the security level received from the bus communication controller 144*b*. Then, the security discriminator 145*b* extracts the personal information items permitting the read operation.

Step S75: The security discriminator 145*b* transfers the extracted personal information items to the bus communication controller 144*b* and requests same to send the items to the computer section 110*b*. Thus, the extracted personal information is sent to the computer section 110*b* via the control bus 171.

Details of the process executed by the bus communication controller 144*b* and the security discriminator 145*b* following Step S73 are identical with the aforementioned process executed in Step S33 and the subsequent steps in FIG. 9 by the bus communication controller 144*a* and the security discriminator 145*a*. Also, where a write operation has been requested from the computer section 110*b*, the procedure followed differs from the aforementioned procedure in that the write request, the security level and the updated telephone directory information from the computer section 110*b* are transferred from the bus communication controller 144*b* to the security discriminator 145*b*.

According to the fourth embodiment, the usage of the telephone directory information 151*a* by the computer section 110*b* can be restricted in accordance with the security levels of the individual application programs installed on the computer section 110*b*, in addition to the degrees of importance of the individual personal information items registered in the telephone directory information, like the second embodiment.

In the first through fourth embodiments described above, the computer section and the mobile phone section exchange data via the control bus 171. Alternatively, in the configuration shown in FIG. 2, the control bus 171 may be omitted, and the computer section and the mobile phone section may be adapted to exchange data via the bus 161, for example. In this case, the communication controller in the computer section 110, 110*a*, 110*b* for controlling the transmission/reception of data to/from the bus 161 may be equipped with the function of the bus communication controller 121, 121*a*, 121*b*, and the communication controller in the mobile phone section 130, 130*a*, 130*b* for controlling the transmission/reception of data to/from the bus 161 may be equipped with the function of the bus communication controller 144, 144*a*, 144*b*.

Fifth Embodiment

Figure 14:
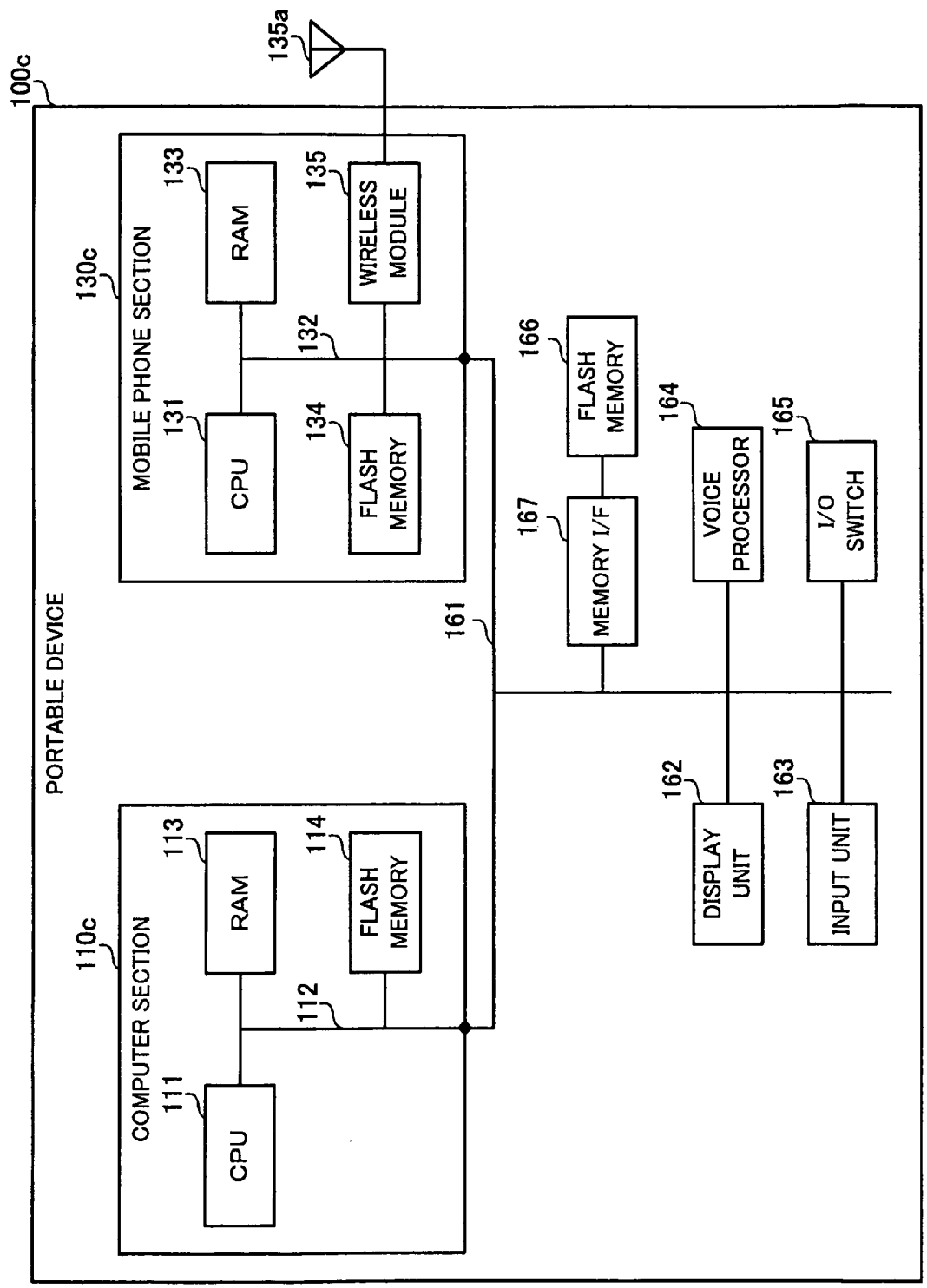
FIG. 14 is a block diagram of a portable device according to a fifth embodiment.

In the first to fourth embodiments, the telephone directory information is stored in the memory in the mobile phone section, but may alternatively be stored in a memory region independent of both the computer section and the mobile phone section, for example. FIG. 14 exemplifies a portable device with such a hardware configuration.

FIG. 14 illustrates the hardware configuration of a portable device according to a fifth embodiment. In FIG. 14, like reference numerals refer to like blocks already explained above with reference to FIG. 2, and description of such blocks is omitted where appropriate.

The portable device 100*c* shown in FIG. 14 does not include the control bus 171 shown in FIG. 2, and is configured such that a computer section 110*c* and a mobile phone section 130*c* can exchange data via the bus 161. The bus 161 is connected additionally with a flash memory 166 and a memory interface (I/F) 167 functioning as an interface between the flash memory 166 and the bus 161.

The portable device 100*c* will be explained first in comparison with the functions (see FIG. 3) of the first embodiment. The flash memory 166 holds the telephone directory information 151 of the first embodiment. The call processor 141 and the electronic mail processor 142 in the mobile phone section 130*c* can freely access, via the memory interface 167, the personal information registered in the telephone directory information 151. Further, the security setter 143 can access the telephone directory information 151 to update its contents.

The memory interface 167 has functions identical with those of the bus communication controller 144 and the security discriminator 145. Namely, when a certain operation with respect to the personal information in the telephone directory information 151 is requested from the computer section 110*c*, the operation requested from the computer section 110*c* is restricted in accordance with the security descriptors set in the telephone directory information 151.

To explain the portable device 100*c* with reference to the functions (see FIG. 6) of the second embodiment, the flash memory 166 holds the telephone directory information 151*a* and the program information 152 of the second embodiment. The memory interface 167 has functions identical with those of the bus communication controller 144*a* and the security discriminator 145*a*. Namely, when a certain operation with respect to the personal information in the telephone directory information 151*a* is requested from the computer section 110*c*, the operation requested from the computer section 110*c* with respect to the individual personal information items in the telephone directory information 151a is restricted depending on the program requesting the operation, that is, in accordance with the security levels set in the program information 152 and the telephone directory information 151a.

Also, where the functions (see FIG. 12) of the fourth embodiment are implemented by the configuration shown in FIG. 14, the telephone directory information 151a is stored in the flash memory 166, and the memory interface 167 is configured to function as both the bus communication controller 144b and the security discriminator 145b.

Although in FIG. 14 the flash memory 166 is connected to the bus 161 via the memory interface 167, a memory region (flash memory 166) independent of both the computer section and the mobile phone section may be connected to the control bus 171 shown in FIG. 2. In this case, the bus interfaces 115 and 136 in FIG. 2 may be individually connected to the memory region such as the flash memory 166 through the memory interface 167, for example.

In the description of the foregoing embodiments, read and rewrite operations with respect to the telephone directory information are mentioned as examples of use of the telephone directory information by the computer section, and such operations are restricted in accordance with the use restriction information (security descriptors, security levels, etc.). Alternatively, as such restricted use of the telephone directory information, the manner in which the computer section can use the read telephone directory information, for example, may be restricted in accordance with the use restriction information.

For example, the use restriction information may be adapted to specify whether or not the read telephone directory information can be saved in the computer section, and whether or not the individual items in the read telephone directory information can be copied and pasted to a predetermined document or drawing in the computer section. To prohibit the read telephone directory information from being saved in the computer section, the personal information in the telephone directory information may be marked "read-only", for example, when transferred from the mobile phone section to the computer section.

With the portable devices described above, the telephone directory information available to the second information processor can be made also accessible from the first information processor while ensuring security.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A portable device with information processing functions including a mobile phone function, comprising:
 a first information processor for processing information by executing a program;
 a second information processor operable in parallel with the first information processor, for implementing the mobile phone function;
 an information storage for storing one or more entries of telephone directory information each including callee identification information identifying a callee to be called by the mobile phone function, the telephone directory information being readable from and updatable by the second information processor, and use restriction information indicating availability of each entry of the telephone directory information, the use restriction information including read permission information indicating whether each entry of the telephone directory information can be read out or not; and
 a use restriction processor, responsive to a read request received from the first information processor and requesting readout of an entry of the telephone directory information, for looking up the use restriction information corresponding to the requested entry of the telephone directory information and, if readout of the requested entry of the telephone directory information is permitted, permitting the requested entry of the telephone directory information to be read out and provided to the first information processor.

2. The portable device according to claim 1, wherein:
 the use restriction information includes, in addition to the read permission information, update permission information indicating whether each entry of the telephone directory information can be updated or not, and
 when an update request to update an entry of the telephone directory information is received from the first information processor, the use restriction processor looks up the use restriction information corresponding to the requested entry of the telephone directory information and, if update of the requested entry of the telephone directory information is permitted, permits the requested entry of the telephone directory information to be updated by means of information provided by the first information processor.

3. The portable device according to claim 2, wherein:
 each entry of the telephone directory information comprises callee-related personal information including the callee identification information and a name of a person as the callee,
 the use restriction information is set with respect to each of information items included in each entry of the telephone directory information,
 when a read request to read out an entry of the telephone directory information is received from the first information processor, the use restriction processor permits only information items whose readout is permitted, to be read from the requested entry of the telephone directory information in accordance with the corresponding use restriction information and provided to the first information processor, and
 when an update request to update an entry of the telephone directory information is received from the first information processor, the use restriction processor permits only information items whose update is permitted among those included in the requested entry of the telephone directory information, to be updated by means of information provided by the first information processor in accordance with the corresponding use restriction information.

4. The portable device according to claim 2, wherein:
 the first information processor is capable of executing one or more programs,
 the use restriction information specifies, with respect to each of the programs executed by the first information processor, at least one function of reading out or updating the telephone directory information, and
 when a read or update operation with respect to an entry of the telephone directory information is requested from the first information processor, the use restriction processor identifies a program requesting the operation and, if it is judged based on the use restriction information that the operation with respect to the requested entry of the telephone directory information is permitted for the identified program, permits the requested operation to be performed with respect to the requested entry of the telephone directory information.

5. The portable device according to claim 4, wherein:
the programs are classified into a plurality of groups according to security such that each of the groups is expressed as group identification information,
the read permission information and the update permission information included in the use restriction information are expressed in such a manner that each of read and update operations with respect to each information item in the telephone directory information is associated with the group identification information identifying a program group permitted to perform the corresponding operation, and
when a read or update operation with respect to an entry of the telephone directory information is requested from the first information processor, the use restriction processor looks up the use restriction information and, if the requested operation specified in the use restriction information is associated with group identification information identifying a program group to which a program requesting the operation belongs, permits the requested operation to be performed with respect to the requested entry of the telephone directory information.

6. The portable device according to claim 5, wherein:
when requesting a read or update operation with respect to the telephone directory information in accordance with one of the programs being executed, the second information processor looks up a grouping table correlating the group identification information with the programs, and outputs the group identification information corresponding to the program requesting the read or update operation, and
when an operation request to read out or update the telephone directory information is received from the second information processor, the use restriction processor determines whether to permit the requested operation or not based on the group identification information received from the second information processor together with the operation request.

7. The portable device according to claim 4, wherein:
when requesting at least one of read and update operations with respect to the telephone directory information, the first information processor sends, to the second information processor, program identification information for identifying a program requesting the operation, and
the use restriction processor identifies the program requesting the operation, based on the program identification information received from the first information processor.

8. An information management method for a portable device with information processing functions including a mobile phone function, wherein:
the portable device is configured to include a first information processor for processing information by executing a program, and a second information processor operable in parallel with the first information processor, for implementing the mobile phone function, and
the information management method comprises:
storing, by an information storage of the portable device, to ctoro one or more entries of telephone directory information each including callee identification information identifying a callee to be called by the mobile phone function, the telephone directory information being readable from and updatable by the second information processor, and use restriction information indicating availability of each entry of the telephone directory information, the use restriction information including read permission information indicating whether each entry of the telephone directory information can be read out;
looking up, by a use restriction processor of the portable device, in response to a read request received from the first information processor and requesting readout of an entry of the telephone directory information, the use restriction information corresponding to the requested entry of the telephone directory information; and
permitting, by the use restriction processor, the requested entry of the telephone directory information to be read out and provided to the first information processor when readout of the requested entry of the telephone directory information is permitted.

9. The information management method according to claim 8, wherein:
the use restriction information includes, in addition to the read permission information, update permission information indicating whether each entry of the telephone directory information can be updated or not, and
when an update request to update an entry of the telephone directory information is received from the first information processor, the use restriction processor looks up the use restriction information corresponding to the requested entry of the telephone directory information and, if update of the requested entry of the telephone directory information is permitted, permits the requested entry of the telephone directory information to be updated by means of information provided by the first information processor.

10. The information management method according to claim 9, wherein:
the first information processor is capable of executing one or more programs,
the use restriction information specifies, with respect to teach of the programs executed by the first information processor, at least one function of reading out or updating the telephone directory information, and
when a read or update operation with respect to an entry of the telephone directory information is requested from the first information processor, the use restriction processor identifies a program requesting the operation and, if it is judged based on the use restriction information that the operation with respect to the requested entry of the telephone directory information is permitted for the identified program, permits the requested operation to be performed with respect to the requested entry of the telephone directory information.

11. The information management method according to claim 10, wherein:
the programs are classified into a plurality of groups according to security such that each of the groups according to security such that each of the groups is expressed as group identification information,
the read permission information and the update permission information included in the use restriction information are expressed in such a manner that each of read and update operations with respect to each information item in the telephone directory information is associated with the group identification information identifying a program group permitted to perform the corresponding operation, and
when a read or update operation with respect to an entry of the telephone directory information is requested from the first information processor, the use restriction processor looks up the use restriction information and, if the requested operation specified in the use restriction information is associated with group identification information identifying a program group to which a program requesting the operation belongs, permits the requested operation to be performed with respect to the requested entry of the telephone directory information.

12. The information management method according to claim 11, wherein:
when requesting a read or update operation with respect to the telephone directory information in accordance with one of the programs being executed, the second information processor looks up a grouping table correlating the group identification information with the programs, and outputs the group identification information corresponding to the program requesting the read or update operation, and
when an operation request to read out or update the telephone directory information is received from the second information processor, the use restriction processor determines whether to permit the requested operation or not based on the group identification information received from the second information processor together with the operation request.

13. The information management method according to claim 10, wherein:
when requesting at least one of read and update operations with respect to the telephone directory information, the first information processor sends, to the second information processor, program identification information for identifying a program requesting the operation, and
the use restriction processor identifies the program requesting the operation, based on the program identification information received from the first information processor.

* * * * *

UNITED STATES PATENT AND TRADEMARK OFFICE
CERTIFICATE OF CORRECTION

| | | |
|---|---|---|
| PATENT NO. | : 8,064,947 B2 | Page 1 of 1 |
| APPLICATION NO. | : 12/289908 | |
| DATED | : November 22, 2011 | |
| INVENTOR(S) | : Hajime Katsumata | |

It is certified that error appears in the above-identified patent and that said Letters Patent is hereby corrected as shown below:

In Claim 8, Column 21, lines 62-63, after the word "device", delete the words "to ctoro".

In Claim 11, Column 22, line 56, at the second occurrence delete the words "according to security such that each of the groups".

Signed and Sealed this
Fourteenth Day of February, 2012

David J. Kappos
*Director of the United States Patent and Trademark Office*